United States Patent
Ward et al.

(10) Patent No.: US 11,270,338 B2
(45) Date of Patent: Mar. 8, 2022

(54) OPTIMIZING A DIGITAL DISPLAY

(71) Applicant: INTERNATIONAL BUSINESS MACHINES CORPORATION, Armonk, NY (US)

(72) Inventors: James Ward, Newburgh, NY (US); Michael Bender, Rye Brook, NY (US); Sarbajit K. Rakshit, Kolkata (IN); Shawn D. Hennessy, Falmouth, ME (US)

(73) Assignee: International Business Machines Corporation, Armonk, NY (US)

(*) Notice: Subject to any disclaimer, the term of this patent is extended or adjusted under 35 U.S.C. 154(b) by 354 days.

(21) Appl. No.: 16/445,458

(22) Filed: Jun. 19, 2019

(65) Prior Publication Data
US 2020/0402096 A1     Dec. 24, 2020

(51) Int. Cl.
*G06Q 30/00*     (2012.01)
*G06Q 30/02*     (2012.01)
*G06N 20/00*     (2019.01)
*G06F 16/28*     (2019.01)

(52) U.S. Cl.
CPC ........ *G06Q 30/0252* (2013.01); *G06F 16/285* (2019.01); *G06N 20/00* (2019.01)

(58) Field of Classification Search
None
See application file for complete search history.

(56) References Cited

U.S. PATENT DOCUMENTS 8,335,715 B2 * 12/2012 Pradeep ............. G06Q 30/0251
705/14.41
9,020,832 B2 * 4/2015 Fisher .................... G06Q 30/02
705/14.1
9,852,329 B2 * 12/2017 Nishikawa ............. H04L 67/18
2010/0029268 A1 * 2/2010 Myer ...................... F21S 9/043
455/426.1
2013/0246168 A1 * 9/2013 Wickramasuriya .........................
H04N 21/8456
705/14.49

(Continued)

FOREIGN PATENT DOCUMENTS

WO     2018057530 A1     3/2018

OTHER PUBLICATIONS

Goetzl, David, Ad pitches head for home plate, Aug. 14, 2000, Advertising Age, vol. 71, Iss. 34 (Year: 2000).*

*Primary Examiner* — Michael W Schmucker
(74) *Attorney, Agent, or Firm* — Schmeiser, Olsen & Watts; Michael A. Petrocelli

(57) ABSTRACT

An approach is provided for optimizing a digital display. Classifications of advertisements are determined. A location of a future action in an event is predicted. A sentiment of an audience is determined. The audience includes spectators at the venue, viewers who are viewing the event via devices receiving a live broadcast of the event, or a combination of the spectators and the viewers. Based on the location of the future action, a digital display is selected from digital displays in the venue and content on the digital display is predicted to be captured as an image by a camera and broadcast to devices of the viewers. Based on the classifications, the sentiment, the location of the future action, and the content being predicted to be captured and broadcast, an advertisement is selected. The selected advertisement is sent to the selected digital display.

14 Claims, 4 Drawing Sheets

(56) References Cited

U.S. PATENT DOCUMENTS

| | | |
|---|---|---|
| 2015/0058102 A1 | 2/2015 | Christensen |
| 2015/0094095 A1* | 4/2015 | Johnson .................. H04W 4/38 |
| | | 455/456.3 |
| 2017/0352058 A1 | 12/2017 | Bender |
| 2018/0324493 A1 | 11/2018 | Narasimhan |
| 2018/0336687 A1* | 11/2018 | Mudretsov ......... G06K 9/00288 |
| 2020/0160064 A1* | 5/2020 | Wang .................. G06K 9/6297 |

* cited by examiner

OPTIMIZING A DIGITAL DISPLAY

BACKGROUND

The present invention relates to optimizing a digital display, and more particularly to selecting content for display on a digital display in a venue of a sporting event based on on-field action and expected response.

During a sporting event at a stadium or other sports venue, advertising is displayed in different places in the sports venue. Historically, sports venue advertisements were physical objects that could not change or be moved. More recently, some sports venue advertisements are projected on video displays located in fixed positions within the venue. While at least some of the audience attending an event at the sports venue can easily see the video display-based advertisements in the stadium, the target audience for the content of these video display-based advertisements includes the much larger audience who watches the event via an electronic broadcast of the event.

SUMMARY

In one embodiment, the present invention provides a method of optimizing a digital display. The method includes determining, by one or more processors, classifications of advertisements that are available for display on a plurality of digital displays in a venue during an event being conducted at the venue. The event includes actions being captured as images by one or more cameras. The images are broadcast to devices of viewers who are viewing the event via the devices receiving a live broadcast of the event. The method further includes using a cognitive analysis engine, predicting, by the one or more processors, a location of a future action in the event. The method further includes using the cognitive analysis engine, determining, by the one or more processors, a sentiment of an audience viewing the event. The audience includes spectators at the venue, the viewers who are viewing the event via the devices, or a combination of the spectators and the viewers. The method further includes based on the predicted location of the future action, the one or more processors (i) selecting a digital display from the plurality of digital displays and (ii) predicting that content on the selected digital display will be captured as an image by a camera and broadcast to the devices of the viewers. The method further includes based on the classifications of the advertisements, the sentiment of the audience, the predicted location of the future action, and the content being predicted to be captured as the image by the camera and broadcast to the devices of the viewers, selecting, by the one or more processors, an advertisement included in the advertisements. The method further includes sending, by the one or more processors, the selected advertisement to the selected digital display.

In another embodiment, the present invention provides a computer program product for optimizing a digital display. The computer program product includes a computer readable storage medium having computer readable program code stored on the computer readable storage medium. The computer readable program code is executed by a central processing unit (CPU) of a computer system to cause the computer system to perform a method. The method includes the computer system determining classifications of advertisements that are available for display on a plurality of digital displays in a venue during an event being conducted at the venue. The event includes actions being captured as images by one or more cameras. The images are broadcast to devices of viewers who are viewing the event via the devices receiving a live broadcast of the event. The method further includes using a cognitive analysis engine, the computer system predicting a location of a future action in the event. The method further includes using the cognitive analysis engine, the computer system determining a sentiment of an audience viewing the event. The audience includes spectators at the venue, the viewers who are viewing the event via the devices, or a combination of the spectators and the viewers. The method further includes based on the predicted location of the future action, the computer system (i) selecting a digital display from the plurality of digital displays and (ii) predicting that content on the selected digital display will be captured as an image by a camera and broadcast to the devices of the viewers. The method further includes based on the classifications of the advertisements, the sentiment of the audience, the predicted location of the future action, and the content being predicted to be captured as the image by the camera and broadcast to the devices of the viewers, the computer system selecting an advertisement included in the advertisements. The method further includes the computer system sending the selected advertisement to the selected digital display.

In another embodiment, the present invention provides a computer system including a central processing unit (CPU); a memory coupled to the CPU; and a computer readable storage device coupled to the CPU. The storage device includes instructions that are executed by the CPU via the memory to implement a method of optimizing a digital display. The method includes the computer system determining classifications of advertisements that are available for display on a plurality of digital displays in a venue during an event being conducted at the venue. The event includes actions being captured as images by one or more cameras. The images are broadcast to devices of viewers who are viewing the event via the devices receiving a live broadcast of the event. The method further includes using a cognitive analysis engine, the computer system predicting a location of a future action in the event. The method further includes using the cognitive analysis engine, the computer system determining a sentiment of an audience viewing the event. The audience includes spectators at the venue, the viewers who are viewing the event via the devices, or a combination of the spectators and the viewers. The method further includes based on the predicted location of the future action, the computer system (i) selecting a digital display from the plurality of digital displays and (ii) predicting that content on the selected digital display will be captured as an image by a camera and broadcast to the devices of the viewers of the event. The method further includes based on the classifications of the advertisements, the sentiment of the audience, the predicted location of the future action, and the content being predicted to be captured as the image by the camera and broadcast to the devices of the viewers, the computer system selecting an advertisement included in the advertisements. The method further includes the computer system sending the selected advertisement to the selected digital display.

DETAILED DESCRIPTION

Overview

Figure 1:
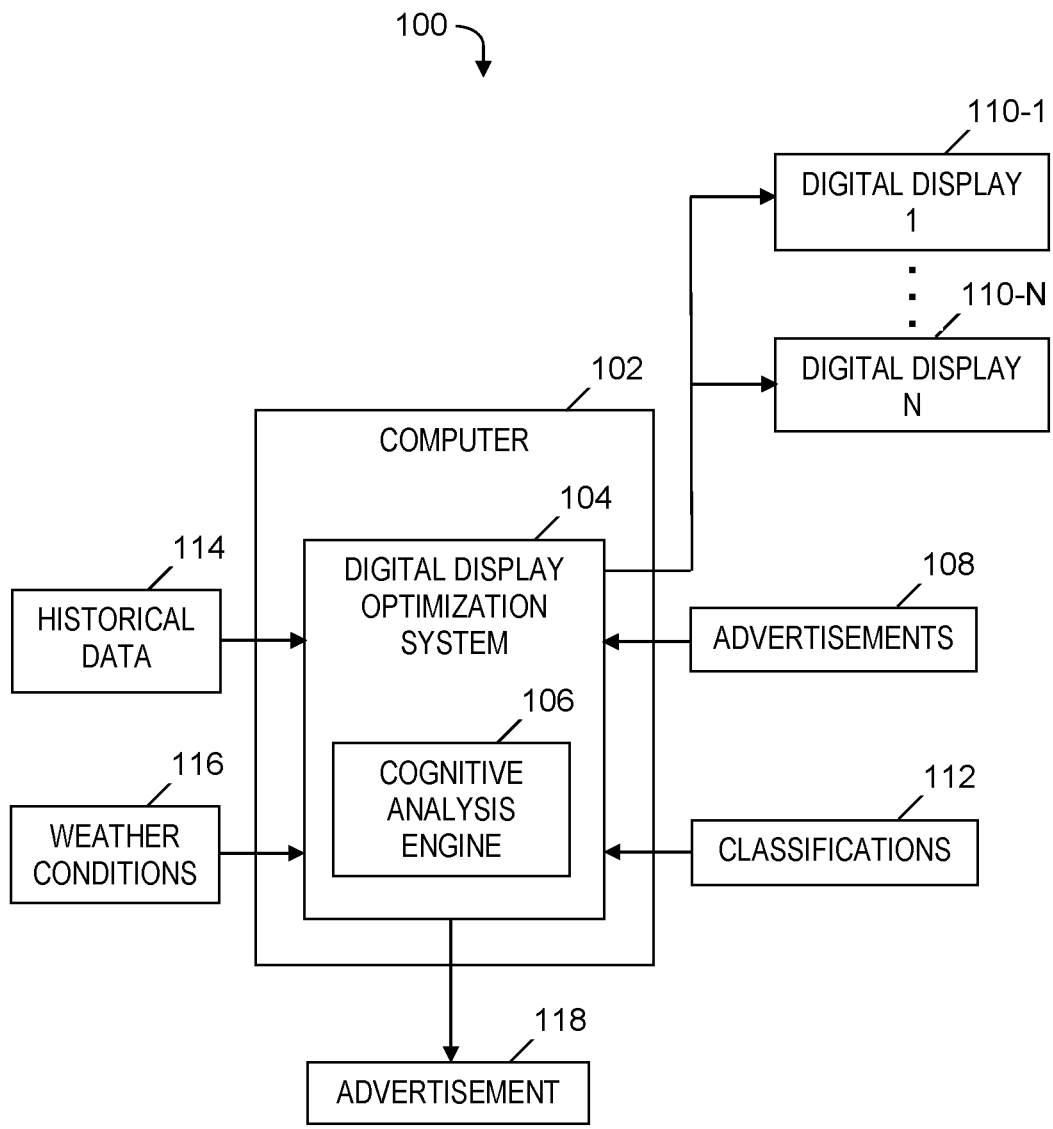
FIG. 1 is a block diagram of a system for optimizing a digital display, in accordance with embodiments of the present invention.

Known techniques for displaying advertisements on digital displays during a sporting event in a sports venue do not optimize a selection of advertising content on the digital displays for viewers who view a broadcast of the sporting event. Without the optimization of the selection of content on the digital displays, the advertisements on the digital displays fail to provide effective targeted advertising to viewers of the broadcasted sporting event. The unique challenges of the known advertisement display techniques that are described above are addressed by embodiments of the present invention. As used herein, a viewer is defined as a person who watches a live broadcast of an event by viewing a screen of a device. As used herein, a device is defined as an electronic machine or electronic component that receives and displays a broadcast of an event. Devices include, for example, television sets, mobile devices, tablets, laptop computers, and desktop computers.

Embodiments of the present invention optimize a selection of advertisements and optimize a timing and a location of a display of the selected advertisements on digital displays in a sports venue. In one embodiment, the optimized selection and display of the advertisements include dynamically selecting particular advertisements from a pool of available advertisements based on (i) a prediction of a location of a future action of the sporting event which is a focus of one or more cameras that are capturing images of the sporting event for an electronic broadcast of the sporting event to devices by which viewers are viewing the sporting event and (ii) a determination of the current sentiment (i.e., mood) of the audience watching the sporting event. As used herein, an audience is defined as a group of people who are viewing an event and consists of spectators who are present at and who are watching the event, viewers who are viewing the event by viewing screens of devices, or a combination of the spectators and the viewers. Embodiments of the present invention use a cognitive analysis engine to (i) predict which digital displays in the sports venue will be visible to the viewers who are viewing the broadcast of the sporting event and (ii) predict a time period when those digital displays will be visible to the viewers who are viewing the broadcast. Embodiments of the present invention manage the displays of advertisements on each digital display in the sports venue based on the mood of the audience so that products and services are not displayed when the viewer (i.e., potential consumer of the product or service) of the digital display is in a negative mood. In one embodiment, the cognitive analysis engine is used to include information on a digital display in the sports venue, where the information is targeted to a proper subset of the audience of the sporting event (e.g., only a portion of the audience that (i) is in a family-oriented section of a sports venue, (ii) consists of fans of the home team participating in the sporting event, or (iii) consists of fans of the visiting team participating in the sporting event).

Although embodiments described herein reference a sporting event at a sports venue, other embodiments utilize variations of the methods and systems described herein to include optimizing digital displays in any kind of venue during other types of events.

Other embodiments of the present invention select or modify content displayed on clothing of an individual, where the clothing has digital display capabilities, and where the selection or modification of the displayed content is based on a prediction of a time at which the individual will be captured in an image that is broadcast to devices of viewers. Alternatively, embodiments of the present invention select or modify content displayed on any other display-capable item, where the selection or modification of the content is based on a prediction of a time at which the item will be captured in an image that is broadcast to devices of viewers.

In one embodiment, a digital display in a venue is a physical digital display located in the venue. In another embodiment, a digital display in a venue is a virtual display whose content overlays a view of a specific space (e.g., advertising space) within the venue, where viewers who are using a device to watch the broadcast of the event in the venue view the overlaid content instead of whatever is actually on the specific space. In one embodiment, the virtual display may display one content for viewers who are located in a first geographic location and another content for viewers in a second geographic location.

System for Optimizing a Digital Display

FIG. 1 is a block diagram of a system 100 for optimizing a digital display, in accordance with embodiments of the present invention. System 100 includes a computer 102, which executes a software-based digital display optimization system 104, which includes a cognitive analysis engine 106. Digital display optimization system 104 accesses a pool of advertisements 108, which are available for display on digital display 110-1, . . . , digital display 110-N, where N is an integer greater than or equal to one. Digital display 110-1, . . . digital display 110-N are located in a venue in which an event is taking place and at which multiple spectators are viewing the event. In one embodiment, the venue is a sports venue, such as a stadium, arena, or field. In one embodiment, the event is a sports event.

Digital display optimization system 104 receives classifications 112 of advertisements 108, where classifications for a given advertisement include desired conditions for displaying the given advertisement. In one embodiment, the desired conditions in classifications 112 are indicated by metadata provided by advertisers. In embodiments of the present invention, the aforementioned desired conditions include a combination of a threshold sentiment rating, a minimum probability of the advertisement being captured by a camera at the venue, a minimum probability of the advertisement being displayed in the broadcast of the event, a maximum number of times the advertisement is permitted to be displayed on a digital display at the venue during the event, a preferred time period for displaying the advertisement on a digital display at the venue during the event, and a positive sentiment of the audience of the event, where the sentiment is associated with audience members who favor the home team in the event or alternatively, a negative sentiment of the audience, where the sentiment is associated with audience members who favor the visiting team in the event.

Digital display optimization system 104 uses cognitive analysis provided by cognitive analysis engine 106 to predict a location of a future action in the event and to determine a sentiment of an audience of the event. In one embodiment, cognitive analysis engine 106 determines the sentiment of the audience by determining the sentiment of spectators located in the venue who are watching the event, the sentiment of viewers who are watching a live broadcast of the event on devices, or the sentiment of a combination of the spectators and the viewers.

Digital display optimization system 104 determines a sentiment of the audience by determining responses of groups of people within the audience, without capturing individual conversations in the audience. Digital display optimization system 104 does not detect any communication of an individual without the consent of the individual.

In one embodiment, cognitive analysis engine 106 determines sentiments of respective segments of the viewers who are viewing the event via devices. The segments can be distinguished by expected sizes of groups of viewers of the event for given geographic areas (e.g., a first segment for viewers located in New York City and a second segment for viewers located in Kansas City, where the first segment is expected to include more viewers than the second segment).

Digital display optimization system 104 accesses historical data 114, which describes the camera angles that were used for respective actions in prior events at the venue, where the prior events were broadcast to devices of viewers. Historical data 114 includes parameters that specify details of actions in the prior events. Cognitive analysis engine 106 compares the parameters of actions in the prior events to parameters of a predicted future action to determine a measurement of similarity between the predicted future action and the actions in the prior events. Using an action in a prior event whose similarity to the predicted future action exceeds a threshold level of similarity, the cognitive analysis engine 106 predicts that the camera angle used for the action in the prior event will be used for the predicted future action, determines that one or more digital displays are included in the predicted camera angle, and predicts that the content on the one or more digital displays included in the predicted camera angle will be captured as an image by camera(s) at the venue and broadcast to devices of viewers of the event.

In one embodiment, digital display optimization system 104 receives weather conditions 116 at the venue. Based on the weather conditions 116, digital display optimization system 104 determines a quality rating of the visibility of the digital displays at the venue. A classification included in classifications 112 specifies a minimum quality rating which is required for an advertisement 118 to be selected by digital display optimization system 104 from the pool of advertisements 108 and to be displayed on a digital display at the venue. The selection of advertisement 118 is also based on other classifications 112 of advertisements 108, the sentiment of the spectators at the venue who are viewing the event, the predicted location of the future action in the event, and the content of a digital display being predicted to be captured as an image by camera(s) and broadcast to devices of viewers of the event.

In one embodiment, cognitive analysis engine 106 uses a natural language processing system (not shown) to detect the meaning of words spoken by announcers who are commenting on the action in the event for viewers who are viewing a broadcast of the event or for spectators who are present at the event. The natural language processing system may also determine the meaning of words spoken by a director or producer who is supervising the broadcast of the event and who is providing instructions that specify that one or more cameras are likely to be used in an upcoming time period during the event. Cognitive analysis engine 106 uses the meanings of the words determined by the natural language processing system as a basis for predicting the views of the event that will be captured by the camera(s) and for predicting which digital display(s) in the venue will be within the views that will be captured by the camera(s). To predict the views of the event that will be captured by the camera(s) and to predict the digital display(s) in the venue that will be within the views, cognitive analysis engine 106 may detect and capture words spoken by the aforementioned announcer, director, or producer, and the natural language processing system may determine the meanings of the spoken words only if the individual announcer, director, or producer has previously provided informed consent for the detection, capture, and meaning determination of her or his spoken words.

Figure 2:
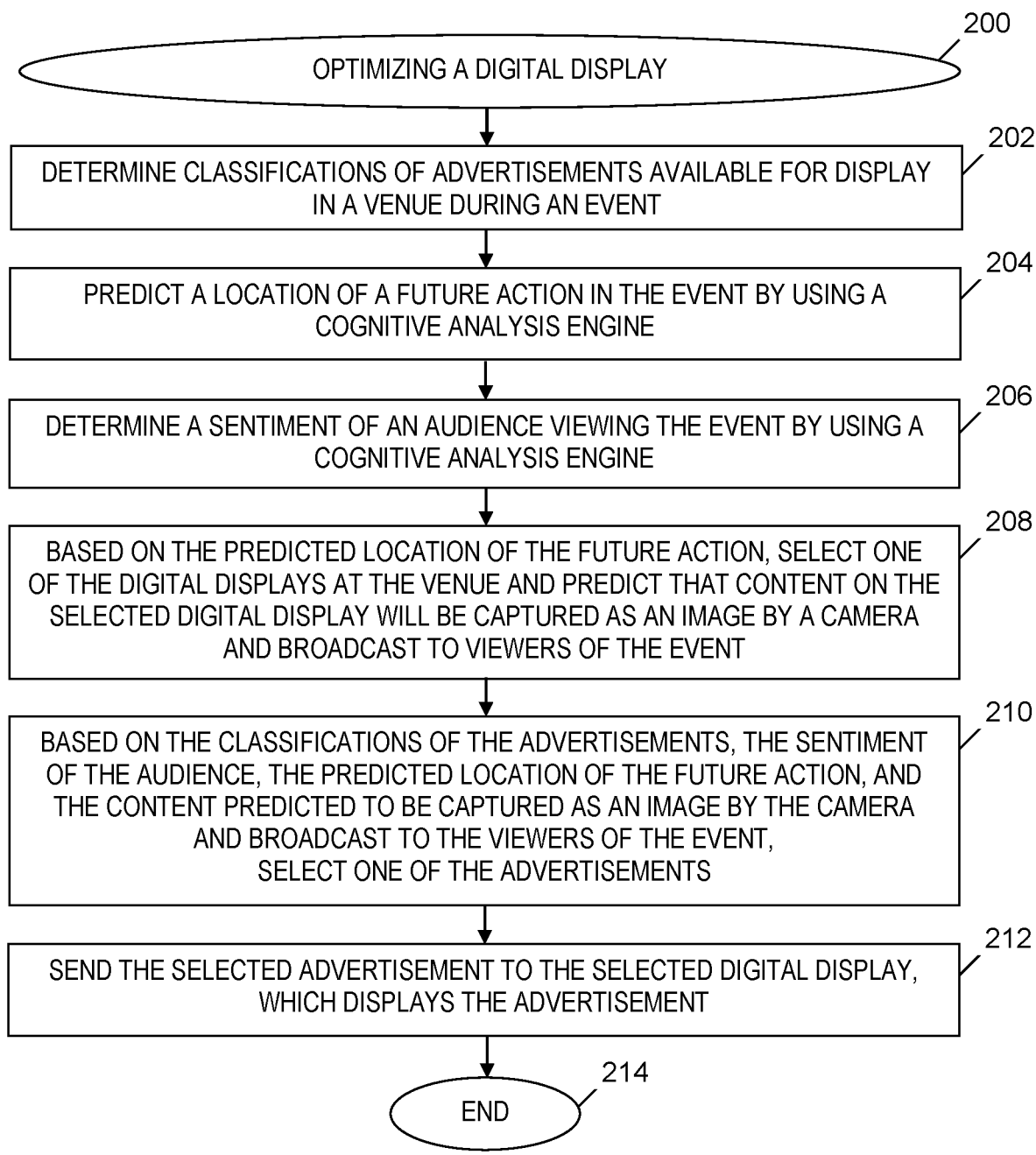
FIG. 2 is a flowchart of a process of optimizing a digital display, where the process is implemented in the system of FIG. 1, in accordance with embodiments of the present invention.
Figure 3:
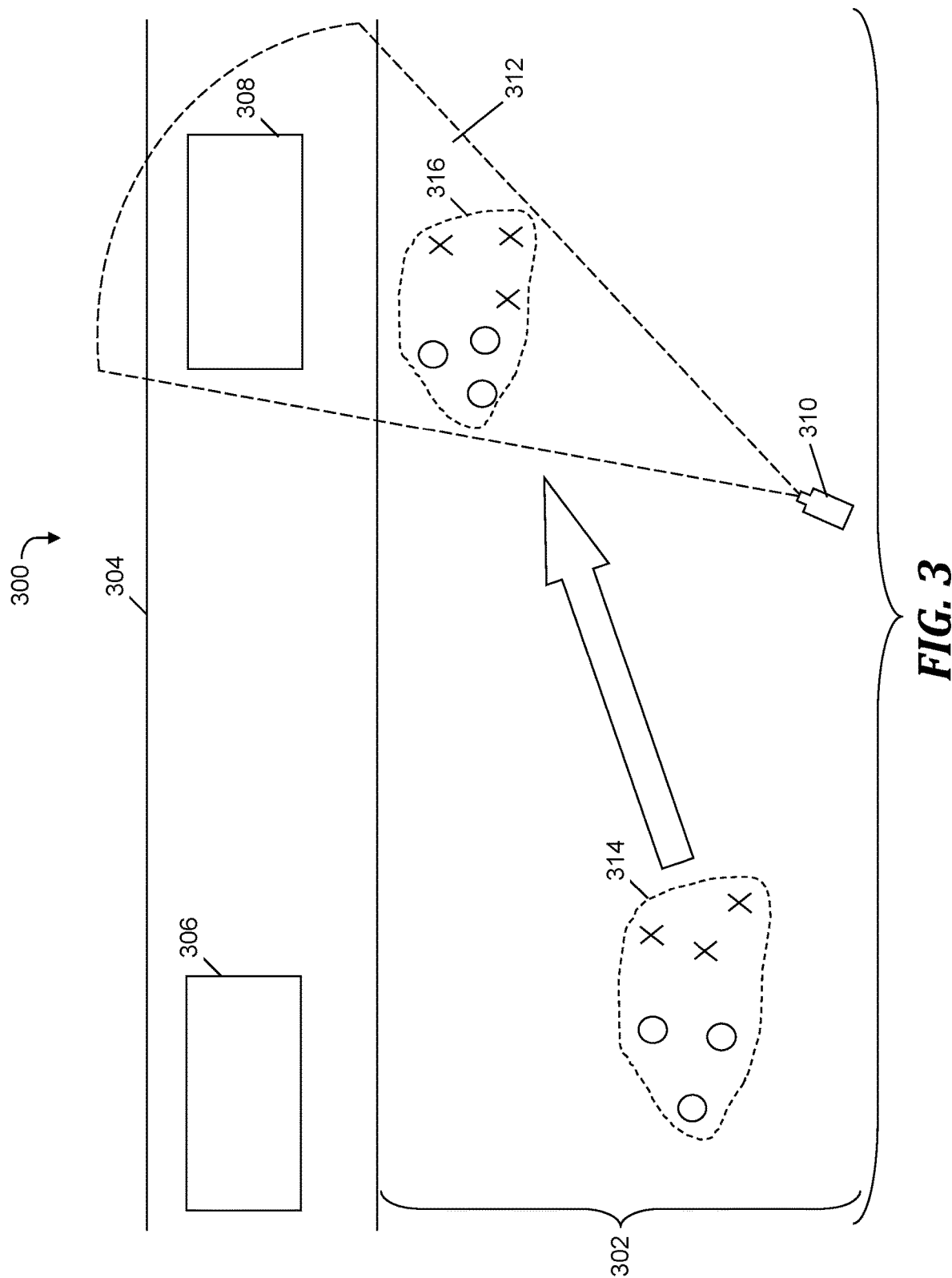
FIG. 3 is an example of optimizing a digital display in a sports venue using the process of FIG. 2 implemented in the system of FIG. 1, in accordance with embodiments of the present invention.
Figure 4:
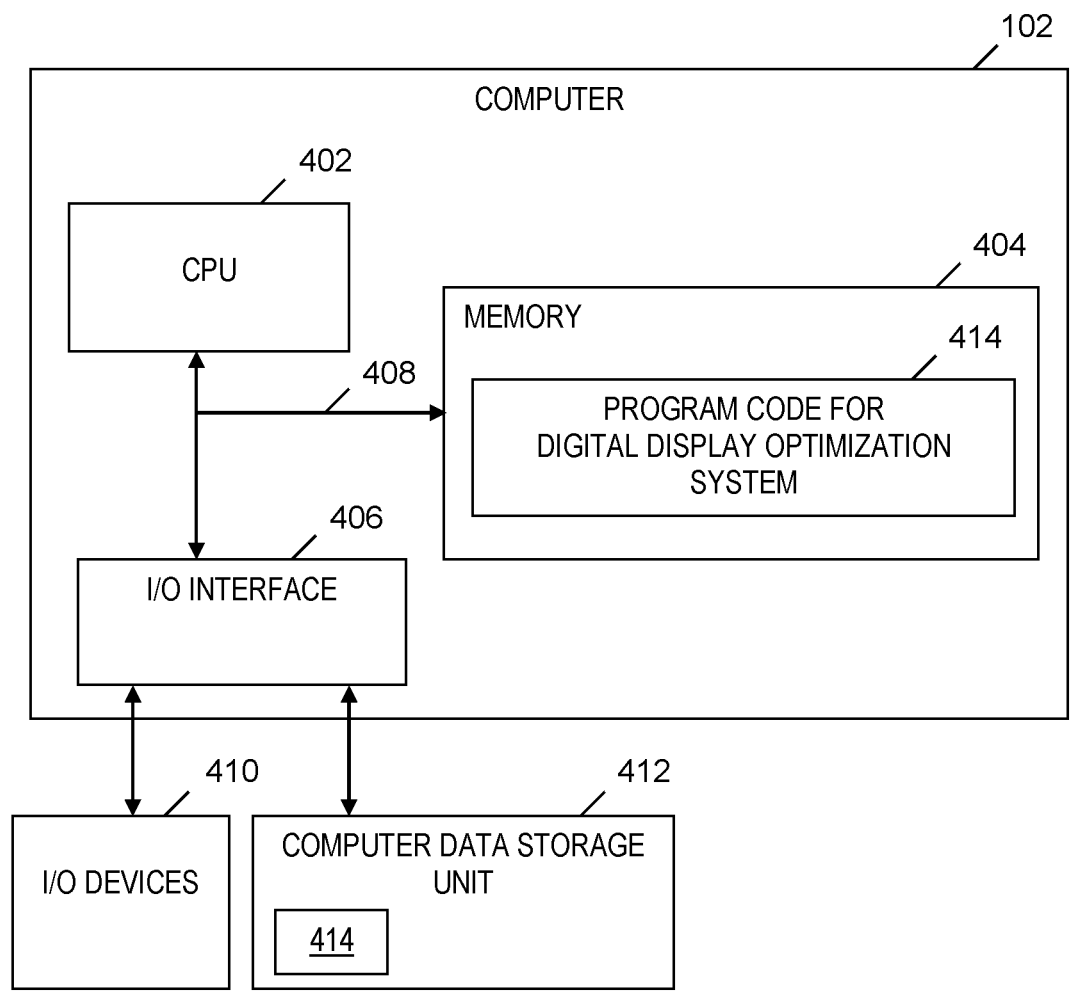
FIG. 4 is a block diagram of a computer included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Optimizing a Digital Display

FIG. 2 is a flowchart of a process of optimizing a digital display, where the process is implemented in the system of FIG. 1, in accordance with embodiments of the present invention. The process of FIG. 2 starts at step 200. In step 202, digital display optimization system 104 (see FIG. 1) loads available advertisements 108 (see FIG. 1) and determines classifications 112 (see FIG. 1) of advertisements 108 (see FIG. 1) available for display in a venue during an event. In one embodiment, the classifications 112 (see FIG. 1) for a given advertisement provided by a given advertiser include desired levels of: (i) a probability of focus time of the advertisement, (ii) a sentiment rating of the audience of the event, (iii) a total amount of time the advertisement is displayed at the venue, (iv) a quality rating indicating a visibility of the advertisement on the digital display based on current weather conditions 116 (see FIG. 1), and (v) priority of the advertisement based on the particular advertiser, price, or any other metric.

Prior to step 204, digital display optimization system 104 (see FIG. 1) determines a current action in the event, such as obtaining the current location of players, the current activities of the players, and/or the current location of the ball used in the event. In step 204, digital display optimization system 104 (see FIG. 1) predicts a future action and a location of the future action in the event by using cognitive analysis engine 106 to analyze historical data 114 to compare a current action in the event to similar actions in prior events at the venue, determine a subsequent action in the prior events (i.e., an action that followed actions in the prior events which were similar to the current action), and determine the location of the subsequent action in the prior events. Digital display optimization system 104 (see FIG. 1) designates the aforementioned subsequent action and the location of the subsequent location as the predicted future action and predicted location of the future action, respectively.

In step 204, digital display optimization system 104 (see FIG. 1) also determines a probability that a particular camera angle will be used for the predicted future action based on camera angles that were used for similar actions in broadcasts of the prior events.

In one embodiment, step 204 includes digital display optimization system 104 (see FIG. 1) generating quality ratings for digital displays the venue, where each quality rating is based on a distance at which a camera will be capturing an image of a given digital display and based on the weather conditions 116 (see FIG. 1) and how similar weather conditions in prior events at the venue affected the visibility of the given digital display.

In step 206, digital display optimization system 104 (see FIG. 1) determines a sentiment of spectators at the venue who are viewing the event by using cognitive analysis engine 106 (see FIG. 1). In one embodiment, digital display optimization system 104 (see FIG. 1) determines the sentiment of the spectators by using sensors to monitor the audible responses of the spectators and determine the type and the volume of sound of the response (e.g., booing or applause). Digital display optimization system 104 (see FIG. 1) may also obtain data from other biometric sensors to determine the sentiment of the spectators. In one embodiment, cognitive analysis engine 106 employs a neural network to rate the sentiment on a scale.

In one embodiment, step 206 includes digital display optimization system 104 (see FIG. 1) capturing biometric feedback from registered viewers who are viewing the broadcast of the event, where the sentiment is based at least in part on the biometric feedback. As used herein, registered viewers are viewers who have given informed consent to provide the biometric feedback.

In one embodiment, prior to step 206, digital display optimization system 104 (see FIG. 1) uses image analysis to identify different classifications of the spectators associated with different sections of the venue. In step 206, digital display optimization system 104 (see FIG. 1) may identify different sentiments of the different classifications of the spectators.

In step 208, based on the location of the future action predicted in step 204, digital display optimization system 104 (see FIG. 1) selects one of the digital displays 110-1, ..., 110-N (see FIG. 1) at the venue and predicts that content on the selected digital display will be captured as an image by a camera and broadcast to devices of viewers of the event.

In one embodiment, digital display optimization system 104 (see FIG. 1) does not select a given digital display in step 208 if the quality rating indicating the visibility of the given digital display is below a predetermined threshold rating.

In step 210, based on the classifications 112 (see FIG. 1) of advertisements 108 (see FIG. 1) determined in step 202, the sentiment of the spectators determined in step 206, the location of the future action predicted in step 204, and the content on the selected digital display predicted in step 208 to be captured as an image by the camera and broadcast to devices of the viewers of the event, digital display optimization system 104 (see FIG. 1) selects one of the advertisements 108 (see FIG. 1) (i.e., selects advertisement 118 (see FIG. 1)).

In one embodiment, digital display optimization system 104 (see FIG. 1) does not select a given advertisement in step 210 because classifications 112 (see FIG. 1) indicate a threshold quality rating for a digital display on which the given advertisement is displayed and the actual quality rating for the digital display is below the threshold quality rating.

In one embodiment, prior to step 210, digital display optimization system 104 (see FIG. 1) modifies weights of the available advertisements based on whether a given advertisement had already been displayed during the event or the number of times that the advertisement has been displayed during the event and how close that number is to a predetermined limit specified in classifications 112 (see FIG. 1). In step 210, digital display optimization system 104 (see FIG. 1) selects the advertisement 118 (see FIG. 1) based in part on the modified weights.

In step 212, digital display optimization system 104 (see FIG. 1) sends advertisement 118 (see FIG. 1) to the digital display selected in step 208. The selected digital display displays advertisement 118 for viewing by the viewers of the event.

After step 212, the process of FIG. 2 ends at step 214.

Examples

As an example, digital display optimization system 104 (see FIG. 1) uses historical data 114 (see FIG. 1) to determine that in prior games at the home stadium of Team XYZ, after a given player on Team XYZ hits a home run, that player commonly goes into the dugout after the home run and then comes out of the dugout for a curtain call to acknowledge the applause of the spectators. Using historical data 114 (see FIG. 1), digital display optimization system 104 (see FIG. 1) determines that Camera C using a particular camera angle at the home stadium of Team XYZ captured images of the players on Team XYZ as they took curtain calls after hitting home runs. In an ongoing baseball game at the home stadium of Team XYZ, digital display optimization system 104 (see FIG. 1) determines that Player A hits a home run and predicts in step 204 that Player A will be in a location at the stadium taking a curtain call. Furthermore, digital display optimization system 104 (see FIG. 1) predicts that Camera C using the aforementioned camera angle will capture an image of Player A taking the curtain call and based on the predicted location and the predicted camera angle, digital display optimization system 104 (see FIG. 1) selects in step 208 one of the digital displays in the stadium that is likely to be captured in the camera angle. Digital display optimization system 104 (see FIG. 1) determines the positive mood of the spectators in step 206 and selects advertisement 118 (see FIG. 1) in step 210. The selection of advertisement 118 (see FIG. 1) is based in part on an advertiser's desire to link Product Z in the content of advertisement 118 (see FIG. 1) to the positive mood detected in step 206. In step 212, digital display optimization system 104 (see FIG. 1) sends advertisement 118 (see FIG. 1) to the digital display selected in step 208 so that the camera captures an image that includes Player A taking a curtain call together with the content of advertisement 118 (see FIG. 1) that mentions Product Z.

As another example, in step 204, digital display optimization system 104 (see FIG. 1) predicts a location of a future action during an upcoming penalty kick in a soccer match and therefore predicts that a particular digital display in the stadium will be in the camera angle of a camera that will capture the penalty kick.

As another example, in step 204, digital display optimization system 104 (see FIG. 1) predicts that a batted baseball will travel near to location near a particular outfield wall based on the trajectory and exit velocity of the baseball off the bat. In step 208, digital display optimization system 104 (see FIG. 1) predicts that a particular digital display on the aforementioned outfield wall will be captured in an image by a camera.

As another example, after a game-ending score in a sporting event, digital display optimization system 104 (see FIG. 1) predicts that there will be a celebration by the winning team on the sidelines based on historical data 114 (see FIG. 1). Digital display optimization system 104 (see FIG. 1) also determines that the winning team is the visiting team. In step 210, digital display optimization system 104

(see FIG. 1) will not be able to select advertisements from certain advertisers who do not want their advertisements to be linked to the negative sentiment of the home team losing the game.

As another example, based on weather conditions 116 (see FIG. 1), digital display optimization system 104 (see FIG. 1) determines that digital displays on outfield walls have a quality rating below a predetermined threshold (i.e., the content on the outfield wall digital displays is not visible). Because of the low quality rating, digital display optimization system 104 (see FIG. 1) will not select any of the outfield wall digital displays in step 208. Digital optimization system 104 (see FIG. 1) calculates the quality of the digital display by comparing current images captured by a camera under given weather conditions and at a given distance between the camera and the digital display to historical images stored in historical data 114 (see FIG. 1) that were captured under conditions similar to the given weather conditions and at camera-to-display distances similar to the given distance.

FIG. 3 is an example 300 of optimizing a digital display in a sports venue using the process of FIG. 2 implemented in the system of FIG. 1, in accordance with embodiments of the present invention. Example 300 includes a field 302 on which a sporting event is being played. A wall 304 forms a border on part of field 302, which is within a stadium. Spectators (not shown) who are watching the sporting event are present in the stadium. Digital displays 306 and 308 are affixed to the wall 304. The stadium includes other digital displays (not shown). A camera 310 is capturing images of the sporting event, where the images are being broadcast to television sets and mobile devices that include displays on which viewers who are located outside the stadium are watching the sporting event. Camera 310 captures images in a key focus area 312. Example 300 depicts players depicted by X's and O's in FIG. 3 who are participating in the sporting event and who are the focus of attention from a time t1 up to and including a subsequent time t2. At time t1, the players are located in a first position 314 on field 302. At time t2 the players are located in a second position 316 on field 302. The arrow in field 302 indicates the movement of the players between time t1 and time t2.

At time t1, based on historical data 114 (see FIG. 1) cognitive analysis engine 106 (see FIG. 1) in step 204 (see FIG. 2) predicts that actions that will be the focus of attention during the sporting event after time t1 and up to and including time t2 will include the players moving from position 314 to position 316. Cognitive analysis engine 106 (see FIG. 1) in step 204 (see FIG. 2) further predicts that because of the predicted actions, camera 310 will be positioned at time t2 to capture images of objects in the key focus area 312. Based on the predicted position 316 and the predicted position of camera 310, digital display optimization system 104 (see FIG. 1) in step 208 (see FIG. 2) selects digital display 308 from the digital displays in the stadium because digital display 308 will be within the key focus area 312 at time t2. Further, digital display optimization system 104 (see FIG. 1) in step 208 (see FIG. 2) predicts that an advertisement shown on digital display 308 at time t2 will be captured as an image by camera 310 and broadcast to the television sets and mobile devices of viewers of the sporting event.

Classifications 112 (see FIG. 1) of advertisements 108 (see FIG. 1) which are available to be included on the digital displays in the stadium during the sporting event indicate that Advertiser XYZ has specified a priority for an advertisement of product ABC to be included on a digital display within a key focus area as long as the sentiment of the spectators of the sporting event mostly includes emotions of happiness and excitement. In step 206, cognitive analysis engine 106 (see FIG. 1) uses image and sound analysis to detect happy and excited expressions on the faces of a majority of the spectators and detect that a majority of the spectators are clapping, cheering, or making other noises that indicate happiness and excitement. Based on the results of the image and sound analysis indicating that most of the spectators are happy and excited, digital display optimization system 104 (see FIG. 1) in step 210 (see FIG. 2) selects the advertisement of product ABC from among the advertisements 108 (see FIG. 1). In step 212, digital display optimization system 104 (see FIG. 1) sends the advertisement of product ABC to digital display 308, but not to digital display 306 and other digital displays in the stadium. At time t2, camera 310 captures an image that includes the advertisement for product ABC displayed on digital display 308 and that captured image is broadcast to devices on which the viewers view the advertisement for product ABC.

Computer System

FIG. 4 is a block diagram of a computer 102 included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for a system that includes digital display optimization system 104 (see FIG. 1) to perform a method of optimizing a digital display, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as, for example, a solid-state drive (SSD), a network-attached storage (NAS) array, a storage area network (SAN)

array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to optimize a digital display. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

In one embodiment, computer data storage unit 412 includes advertisements 108 (see FIG. 1), classifications 112 (see FIG. 1), and historical data 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimize a digital display. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to optimize a digital display. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimizing a digital display.

While it is understood that program code 414 for optimizing a digital display may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of optimizing a digital display. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of optimizing a digital display, the method comprising:

determining, by one or more processors, classifications of advertisements that are available for display on a plurality of digital displays in a venue during an event being conducted at the venue, the event including actions being captured as images by one or more cameras, and the images being broadcast to devices of viewers who are viewing the event via the devices receiving a live broadcast of the event;

using a cognitive analysis engine, predicting, by the one or more processors, a location of a future action in the event;

using the cognitive analysis engine, determining, by the one or more processors, a sentiment of an audience viewing the event, the audience including spectators at the venue, the viewers who are viewing the event via the devices, or a combination of the spectators and the viewers;

based on the predicted location of the future action, the one or more processors (i) selecting a digital display from the plurality of digital displays and (ii) predicting that content on the selected digital display will be captured as an image by a camera and broadcast to the devices of the viewers;

based on the classifications of the advertisements, the sentiment of the audience, the predicted location of the future action, and the content being predicted to be captured as the image by the camera and broadcast to the devices of the viewers, selecting, by the one or more processors, an advertisement included in the advertisements;

using historical data, associating, by the one or more processors, locations of actions in prior sporting events at the venue with respective digital displays included in the plurality of digital displays whose contents were captured as images by cameras as a result of the actions in the prior sporting events, wherein the predicting that the content on the selected digital display will be captured as the image by the camera and broadcast to the devices of the viewers of the event is based on the locations of the actions in the prior sporting events being associated with the respective digital displays;

using machine learning and based on the historical data, determining, by the one or more processors, one or more digital displays that will be in a camera angle of the camera; and determining, by the one or more processors, that the digital display is included in the one or more digital displays that will be in the camera angle, wherein the selecting the digital display is further based on the digital display being included in the one or more digital displays that will be in the camera angle, and wherein the predicting that the content on the selected digital display will be captured as the image by the camera and broadcast to the devices of the viewers is further based on the digital display being included in the one or more digital displays that will be in the camera angle; and sending, by the one or more processors, the selected advertisement to the selected digital display.

2. The method of claim 1, further comprising:

receiving, by the one or more processors, a threshold sentiment rating associated with the advertisement;

generating, by the one or more processors, a sentiment rating for the sentiment of the audience viewing the event by monitoring types and sound levels of audible reactions of the audience, facial expressions of people in the audience, data from Internet of Things (IoT) objects local to the venue, or data from IoT feeds from the viewers; and determining, by the one or more processors, that the sentiment rating exceeds the threshold sentiment rating, wherein the selecting the advertisement is further based on the sentiment rating exceeding the threshold sentiment rating.

3. The method of claim 1, further comprising:

receiving, by the one or more processors, a maximum number of times that the advertisement is allowed to be displayed during the event on one or more digital displays included in the plurality of digital displays and a time period during which the advertisement is preferred to be displayed during the event;

determining, by the one or more processors, a count of how many times the advertisement has been displayed during the event;

determining, by the one or more processors, a time for the advertisement to be displayed on the selected digital display, the time being relative to a clock associated with the event; and determining, by the one or more processors, that the count is less than the maximum number of times that the advertisement is allowed to be displayed during the event and determining the time for the advertisement to be displayed is during the time period during which the advertisement is preferred to be displayed, wherein the selecting the advertisement is further based on the count of how many times the advertisement has been displayed during the event being less than the maximum number of times that the advertisement is allowed to be displayed during the event and the time for the advertisement to be displayed being during the time period during which the advertisement is preferred to be displayed.

4. The method of claim 1, further comprising:

determining, by the one or more processors, that the sentiment of the audience expresses a positive emotion associated with a home team participating in the event, the event being a sporting event, wherein the selecting the advertisement is further based on the sentiment expressing the positive emotion associated with the home team.

5. The method of claim 1, further comprising:

determining, by the one or more processors, that the sentiment of the audience expresses a negative emotion associated with a home team participating in the event, the event being a sporting event in which the home team is playing against a visiting team, wherein the selecting the advertisement is further based on the sentiment expressing the negative emotion associated with the home team and includes selecting the advertisement to be of interest to a subset of the viewers who favor the visiting team over the home team.

6. The method of claim 1, further comprising:

receiving, by the one or more processors, a threshold quality rating associated with a clarity of an image on the digital display;

determining, by the one or more processors, weather conditions during the event which affect the clarity of the image;

based on the weather conditions, determining, by the one or more processors, an expected quality rating of the advertisement displayed on the digital display, the expected quality rating indicating an expected clarity of the image on the digital display; and determining, by the one or more processors, that the expected quality rating of the advertisement exceeds the threshold quality rating, wherein the selecting the advertisement is further based on the expected quality rating of the advertisement exceeding the threshold quality rating.

7. The method of claim 1, further comprising the step of:

providing at least one support service for at least one of creating, integrating, hosting, maintaining, and deploying computer readable program code in the computer, the program code being executed by a processor of the computer to implement determining the classifications, predicting the location of the future action, determining the sentiment, selecting the digital display, predicting that the content will be captured, selecting the advertisement, associating the locations of the actions in the prior sporting events at the venue with the respective digital displays, determining the one or more digital displays that will be in the camera angle, and determining that the digital display is included in the one or more digital displays that will be in the camera angle, and sending the selected advertisement to the selected digital display.

8. A computer program product for optimizing a digital display, the computer program product comprising a computer readable storage medium having computer readable program code stored on the computer readable storage medium, the computer readable program code being executed by a central processing unit (CPU) of a computer system to cause the computer system to perform a method comprising the steps of:

the computer system determining classifications of advertisements that are available for display on a plurality of digital displays in a venue during an event being conducted at the venue, the event including actions being captured as images by one or more cameras, and the images being broadcast to devices of viewers who are viewing the event via the devices receiving a live broadcast of the event;

using a cognitive analysis engine, the computer system predicting a location of a future action in the event;

using the cognitive analysis engine, the computer system determining a sentiment of an audience viewing the event, the audience including spectators at the venue, the viewers who are viewing the event via the devices, or a combination of the spectators and the viewers;

based on the predicted location of the future action, the computer system (i) selecting a digital display from the plurality of digital displays and (ii) predicting that content on the selected digital display will be captured as an image by a camera and broadcast to the devices of the viewers;

based on the classifications of the advertisements, the sentiment of the spectators, the predicted location of the future action, and the content being predicted to be captured as the image by the camera and broadcast to the devices of the viewers, the computer system selecting an advertisement included in the advertisements;

using historical data, the computer system associating locations of actions in prior sporting events at the venue with respective digital displays included in the plurality of digital displays whose contents were captured as images by cameras as a result of the actions in the prior sporting events, wherein the predicting that the content on the selected digital display will be captured as the image by the camera and broadcast to the devices of the viewers of the event is based on the locations of the actions in the prior sporting events being associated with the respective digital displays;

using machine learning and based on the historical data, the computer system determining one or more digital displays that will be in a camera angle of the camera; and the computer system determining that the digital display is included in the one or more digital displays that will be in the camera angle, wherein the selecting the digital display is further based on the digital display being included in the one or more digital displays that will be in the camera angle, and wherein the predicting that the content on the selected digital display will be captured as the image by the camera and broadcast to the devices of the viewers is further based on the digital display being included in the one or more digital displays that will be in the camera angle; and the computer system sending the selected advertisement to the selected digital display.

9. The computer program product of claim 8, wherein the method further comprises:
the computer system receiving a threshold sentiment rating associated with the advertisement;
the computer system generating a sentiment rating for the sentiment of the audience viewing the event by monitoring types and sound levels of audible reactions of the audience, facial expressions of people in the audience, data from Internet of Things (IoT) objects local to the venue, or data from IoT feeds from the viewers; and
the computer system determining that the sentiment rating exceeds the threshold sentiment rating, wherein the selecting the advertisement is further based on the sentiment rating exceeding the threshold sentiment rating.

10. The computer program product of claim 8, wherein the method further comprises:
the computer system receiving a maximum number of times that the advertisement is allowed to be displayed during the event on one or more digital displays included in the plurality of digital displays and a time period during which the advertisement is preferred to be displayed during the event;
the computer system determining a count of how many times the advertisement has been displayed during the event;
the computer system determining a time for the advertisement to be displayed on the selected digital display, the time being relative to a clock associated with the event; and
the computer system determining that the count is less than the maximum number of times that the advertisement is allowed to be displayed during the event and determining the time for the advertisement to be displayed is during the time period during which the advertisement is preferred to be displayed,
wherein the selecting the advertisement is further based on the count of how many times the advertisement has been displayed during the event being less than the maximum number of times that the advertisement is allowed to be displayed during the event and the time for the advertisement to be displayed being during the time period during which the advertisement is preferred to be displayed.

11. The computer program product of claim 8, wherein the method further comprises:
the computer system determining that the sentiment of the audience expresses a positive emotion associated with a home team participating in the event, the event being a sporting event,
wherein the selecting the advertisement is further based on the sentiment expressing the positive emotion associated with the home team.

12. A computer system comprising:
a central processing unit (CPU);
a memory coupled to the CPU; and
a computer readable storage device coupled to the CPU, the computer readable storage device containing instructions that are executed by the CPU via the memory to implement a method of optimizing a digital display, the method comprising the steps of:
the computer system determining classifications of advertisements that are available for display on a plurality of digital displays in a venue during an event being conducted at the venue, the event including actions being captured as images by one or more cameras, and the images being broadcast to devices of viewers who are viewing the event via the devices receiving a live broadcast of the event;
using a cognitive analysis engine, the computer system predicting a location of a future action in the event;
using the cognitive analysis engine, the computer system determining a sentiment of an audience viewing the event, the audience including spectators at the venue, the viewers who are viewing the event via the devices, or a combination of the spectators and the viewers;
based on the predicted location of the future action, the computer system (i) selecting a digital display from the plurality of digital displays and (ii) predicting that content on the selected digital display will be captured as an image by a camera and broadcast to the devices of the viewers;
based on the classifications of the advertisements, the sentiment of the audience, the predicted location of the future action, and the content being predicted to be captured as the image by the camera and broadcast to the devices of the viewers, the computer system selecting an advertisement included in the advertisements;

using historical data, the computer system associating locations of actions in prior sporting events at the venue with respective digital displays included in the plurality of digital displays whose contents were captured as images by cameras as a result of the actions in the prior sporting events, wherein the predicting that the content on the selected digital display will be captured as the image by the camera and broadcast to the devices of the viewers of the event is based on the locations of the actions in the prior sporting events being associated with the respective digital displays;

using machine learning and based on the historical data, the computer system determining one or more digital displays that will be in a camera angle of the camera; and the computer system determining that the digital display is included in the one or more digital displays that will be in the camera angle, wherein the selecting the digital display is further based on the digital display being included in the one or more digital displays that will be in the camera angle, and wherein the predicting that the content on the selected digital display will be captured as the image by the camera and broadcast to the devices of the viewers is further based on the digital display being included in the one or more digital displays that will be in the camera angle; and the computer system sending the selected advertisement to the selected digital display.

13. The computer system of claim 12, wherein the method further comprises:

the computer system receiving a threshold sentiment rating associated with the advertisement;

the computer system generating a sentiment rating for the sentiment of the audience viewing the event by monitoring types and sound levels of audible reactions of the audience, facial expressions of people in the audience, data from Internet of Things (IoT) objects local to the venue, or data from IoT feeds from the viewers; and the computer system determining that the sentiment rating exceeds the threshold sentiment rating, wherein the selecting the advertisement is further based on the sentiment rating exceeding the threshold sentiment rating.

14. The computer system of claim 12, wherein the method further comprises:

the computer system receiving a maximum number of times that the advertisement is allowed to be displayed during the event on one or more digital displays included in the plurality of digital displays and a time period during which the advertisement is preferred to be displayed during the event;

the computer system determining a count of how many times the advertisement has been displayed during the event;

the computer system determining a time for the advertisement to be displayed on the selected digital display, the time being relative to a clock associated with the event; and the computer system determining that the count is less than the maximum number of times that the advertisement is allowed to be displayed during the event and determining the time for the advertisement to be displayed is during the time period during which the advertisement is preferred to be displayed, wherein the selecting the advertisement is further based on the count of how many times the advertisement has been displayed during the event being less than the maximum number of times that the advertisement is allowed to be displayed during the event and the time for the advertisement to be displayed being during the time period during which the advertisement is preferred to be displayed.

* * * * *